(12) United States Patent
Larsen et al.

(10) Patent No.: US 6,942,261 B2
(45) Date of Patent: Sep. 13, 2005

(54) LINEAR ACTUATOR WITH AN INTERNAL DAMPENING MECHANISM

(75) Inventors: Alan R. Larsen, Layton, UT (US); Bradley W. Smith, Ogden, UT (US); David W. Lindsey, Farr West, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/640,845

(22) Filed: Aug. 14, 2003

(65) Prior Publication Data

US 2005/0035608 A1 Feb. 17, 2005

(51) Int. Cl.[7] .......................... B60R 19/20; B60R 21/34
(52) U.S. Cl. .................... 293/107; 293/117; 280/730.1; 180/274; 60/638
(58) Field of Search ................................ 293/107, 108, 293/118, 116, 117; 280/274, 730.1, 770; 60/632, 636, 637, 638; 277/917, 928; 180/274

(56) References Cited

U.S. PATENT DOCUMENTS

| | | | |
|---|---|---|---|
| 2,728,620 A | * 12/1955 | Krueger | ...................... 277/584 |
| 3,039,347 A | 6/1962 | Krauss et al. | |
| 3,199,288 A | 8/1965 | Nahas | |
| 3,715,130 A | 2/1973 | Harada et al. | |
| 3,801,147 A | * 4/1974 | Barrett et al. | .................. 293/9 |
| 3,853,199 A | 12/1974 | Hirashima et al. | |
| 3,992,047 A | 11/1976 | Barenyi et al. | |
| 4,037,821 A | 7/1977 | Greene | |
| 4,091,621 A | 5/1978 | Patrichi | |
| 4,237,690 A | 12/1980 | Tsuge et al. | |
| 4,360,228 A | 11/1982 | Rasmussen et al. | |
| 4,514,002 A | 4/1985 | McIntosh | |
| 4,582,351 A | 4/1986 | Edwards | |
| 4,718,647 A | * 1/1988 | Ludwig | ................... 267/64.11 |
| 4,932,697 A | 6/1990 | Hun | |
| 5,052,732 A | 10/1991 | Oplet et al. | |

(Continued)

FOREIGN PATENT DOCUMENTS

| | | |
|---|---|---|
| DE | 33 13713 | 10/1984 |
| DE | 4 131 734 | 4/1993 |
| DE | 197 24 628 | 1/1998 |
| DE | 199 45 844 | 3/2001 |
| EP | 0 535 175 | 12/1994 |
| EP | 0 648 941 | 4/1995 |
| EP | 0 927 669 | 7/1999 |
| WO | WO-95/07415 | 3/1995 |
| WO | WO-98/33683 | 8/1998 |
| WO | WO-01/23225 | 4/2001 |
| WO | WO-02/055337 | 7/2002 |

OTHER PUBLICATIONS

"Displacement Controlled Linear Actuator with Differential Cylinder—A Way to Save Primary Energy in Mobile Machines," Robert Rahmfeld et al. Technical University of Hamburg, pp. 1–6.

*Primary Examiner*—Patricia L. Engle
(74) *Attorney, Agent, or Firm*—Sally J. Brown

(57) ABSTRACT

A linear actuator with an internal dampening mechanism is disclosed. The actuator has a housing has a first end and a second end and forms an internal chamber. A constricted opening is also added to the actuator at the first end. A piston is disposed within the housing and is capable of sliding along the chamber. The piston has a head portion and a shaft portion. The shaft portion is slidable through the constricted opening whereas the head portion is not slidable through the constricted opening. A fluid is also added to the actuator. The fluid is disposed within the housing. In one embodiment, the actuator is constructed such that the sliding of the shaft portion forces a fluid through the constricted opening such that the movement of the piston is dampened. In an alternative embodiment, the actuator includes one or more second pistons and an orifice. In this embodiment, the actuator is constructed such that the sliding of the piston forces the fluid through the orifice and causes the second pistons to telescopically extend from the first piston.

29 Claims, 8 Drawing Sheets

U.S. PATENT DOCUMENTS

| | | | |
|---|---|---|---|
| 5,117,743 A * | 6/1992 | Yuda ............................ 92/128 |
| 5,280,769 A * | 1/1994 | Yates ..................... 123/184.54 |
| 5,303,631 A | 4/1994 | Frehaut et al. |
| 5,370,429 A | 12/1994 | Reuber et al. |
| 5,520,428 A | 5/1996 | Bell |
| 5,582,010 A | 12/1996 | Lell |
| 5,624,143 A | 4/1997 | Waldschmitt |
| 5,632,518 A | 5/1997 | Kendall |
| 5,639,117 A | 6/1997 | Mandzy et al. |
| 5,713,596 A | 2/1998 | Messina et al. |
| 5,727,826 A | 3/1998 | Frank et al. |
| 5,810,427 A | 9/1998 | Hartmann et al. |
| 5,967,573 A | 10/1999 | Wang |
| 6,039,347 A | 3/2000 | Maynard |
| 6,079,745 A | 6/2000 | Wier |
| 6,086,059 A * | 7/2000 | Runesson et al. ........ 267/64.11 |
| 6,089,628 A | 7/2000 | Schuster |
| 6,102,439 A | 8/2000 | Smithson et al. |
| 6,183,025 B1 | 2/2001 | Hope et al. |
| 6,183,042 B1 | 2/2001 | Unrath |
| 6,264,258 B1 | 7/2001 | Li et al. |
| 6,312,027 B1 * | 11/2001 | Yang ......................... 293/118 |
| 6,371,540 B1 | 4/2002 | Campanella et al. |
| 6,394,512 B1 * | 5/2002 | Schuster et al. .............. 293/15 |
| 6,435,578 B1 * | 8/2002 | Li .............................. 293/134 |
| 6,474,489 B2 | 11/2002 | Payne et al. |
| 6,709,035 B1 * | 3/2004 | Namuduri et al. .......... 293/118 |
| 2002/0033755 A1 | 3/2002 | Ishizaki et al. |
| 2002/0070524 A1 | 6/2002 | Hedenberg |
| 2002/0109427 A1 | 8/2002 | Hochhalter et al. |
| 2005/0062264 A1 * | 3/2005 | Arwood et al. .......... 280/730.1 |

\* cited by examiner

LINEAR ACTUATOR WITH AN INTERNAL DAMPENING MECHANISM

BACKGROUND OF THE INVENTION

1. Field of the Invention

The present invention relates to linear actuators. More specifically, the present invention relates to a linear actuator with an internal dampening mechanism capable of adequately dampening the motion of the piston at the end of the stroke.

2. Description of the Related Art

Linear actuators are well known as an efficient and very flexible mechanism for producing constant and uniform linear motion. As a result, they are commonly used in many industrial settings that require or involve linearly moving an object or load. Hydraulic lifts, such as the type found on most heavy equipment or machinery, are but one well-known example of the way in which linear actuators have been used in industry.

A linear actuator comprises four main components: a housing, a piston (sometimes called a "piston rod"), a fluid, and a displacement mechanism (often called a "power supply"). In general, these components are arranged such that the displacement mechanism transfers or introduces power to the fluid. In turn, the fluid then transfers the power to the piston and causes the piston to undergo linear displacement. It is this transfer of power through the fluid that allows the actuator to achieve a uniform and constant mechanical motion of the piston.

In the simple actuator, the displacement mechanism used may be a pump, a motor, a mechanical lever, a pyrotechnic, or other mechanism that pressurizes the fluid. Generally, the displacement mechanism pressurizes the fluid so as to cause the fluid to exert a pressure or force upon the piston. This is preferably accomplished by either adding fluid from a fluid reservoir or by generating additional fluid through a chemical reaction or pyrotechnic event.

Typically, the fluid used in a linear actuator is a hydraulic fluid. Both liquid fluids and gaseous fluids may be used. As different fluids impart different characteristics to the actuator, the selection of the fluid, as well as the determination of whether the fluid should be a liquid or a gas, depends largely on the desired application.

The housing and piston are coupled together such that as the pressure is applied to the piston by the fluid, the piston extends or retracts linearly from the housing. The rate at which the fluid is pressurized usually determines the rate at which the piston moves. However, because the housing is generally secured to a stationary member or other solid surface, the position of the housing is usually fixed.

As the piston extends or retracts from the housing, the piston causes the moveable member to uniformly move in a desired direction. This moveable member or object is preferably positioned outside the actuator and is mechanically secured to the piston, although such features are not required. Usually, the piston causes the moveable member to undergo linear displacement. However, if the linear actuator is combined with gears, hinges, struts, or the like, rotary and/or non-linear motion may also be achieved.

Generally, the piston is a rod, ram, plunger, or other similar structure that is disposed within the housing. As a result, the terms "piston rod," "ram," or "plunger" may often be used interchangeably with the term "piston." However, for the sake of simplicity and clarity, as used herein, the term "piston" refers to the member that extends or retracts from the housing, regardless of the specific shape, configuration, and/or orientation that is used.

In addition to the simple actuator described above, it is also common to encounter actuators that include one or more additional pistons. Such actuators are often referred to as "telescoping" actuators because the additional pistons slide within each other like in a telescope.

Linear actuators are further classified as either single-acting or double-acting. In a single-acting actuator, the fluid moves the piston within the housing in only one direction. An external force such as gravity returns the piston to a non-extended position. However, in a double-acting actuator, the fluid is directed such that the fluid may be used both to extend and retract the piston.

Pyrotechnic linear actuators are a particular type of single-acting actuator that have been used in the automotive safety industry. In a pyrotechnic linear actuator, the displacement mechanism is a pyrotechnic charge that may be ignited through an initiator. Ignition of the pyrotechnic produces a volume of hot gas, which in turn, exerts pressure and force upon the piston sufficient to cause the piston to extend from the housing. A particular advantage of pyrotechnic linear actuators is that they can be designed to produce rapid and reliable motion of the piston, and as such, have been employed as an instrument for deploying components designed to protect and aid a vehicle occupant during a crash or other accident.

More specifically, some pyrotechnic linear actuators have been used in association with modified vehicle bumper systems that are designed to increase the bumper's ability to protect the vehicle and/or the vehicle occupant during a crash. Usually such applications involve employing the actuator to deploy a reactive member, such as a deformable plate and/or all or a portion of a bumper, into a position that provides optimal impact protection to the vehicle.

Bumper airbag systems are another type of modified bumper system that have incorporated a linear actuator. Such systems are designed such that in the event of an accident, a linear actuator causes an airbag, similar to the type used on steering wheels and dashboards, to inflate on the exterior of the vehicle. Addition of a bumper airbag system has been shown to be desirable to reduce the severity of the accident by absorbing and dissipating a portion of the energy produced by the crash.

Unfortunately, many known linear actuators have significant limitations that affect their efficacy in both modified bumper systems and other mechanical systems generally. More specifically, many known linear actuators are heavy, bulky, and costly to produce, and thus, are unsuitable for many commercial applications in which space, weight, size, and/or cost are at a premium.

In addition, many known linear actuators, especially pyrotechnic actuators, are limited by the fact that they are "one shot" actuators. This means that the actuator may only be used once to deploy the piston. After this first use, the actuator must be discarded and replaced.

Perhaps more importantly, many known actuators fail to provide an adequate mechanism for dampening the movement of the piston at the end of the stroke. "Stroke" is the linear distance the piston travels from a fully retracted position to a fully extended position. In most situations, the displacement mechanism exerts sufficient pressure or force upon the piston to cause the piston to move at a high rate of speed. This is especially true in pyrotechnic actuators in which energy from the pyrotechnic event is used to extend the piston. Unless a mechanism or system is provided to dampen or brake the movement of the piston, the piston will reach the end of the housing at a high velocity, thereby causing the piston to forcibly impact the housing, the moveable member, or the external system employing the actuator. Such forcible impact is undesirable and may cause significant damage.

In the automotive safety industry, failure to adequately dampen the movement of the piston at the end of the stroke can be particularly detrimental. As noted above, the purpose of airbags and other safety components is to provide systems that reduce the severity of the crash by absorbing and dissipating a portion of the kinetic energy produced by the crash. However, if the movement of the piston is not adequately dampened, the piston will forcibly impact the vehicle and/or the airbag or other safety system. Such impact endangers the vehicle occupants because not only does it increase the kinetic energy and the severity of the crash, but also it may render the airbag or other vehicle safety components inoperable.

In an effort to combat these problems, some linear actuators have been developed with dampening mechanisms designed to dissipate the motion of the piston by compressing a fluid through an external orifice. Unfortunately, these mechanisms are limited by the fact that they add complexity, size, and bulk to the actuator. These dampening mechanisms also increase the costs associated with the production and assembly of the actuator. Furthermore, as such dampening mechanisms require extra components through which the fluid must flow, there is an increased likelihood that the actuator will leak and/or require maintenance to remain fully serviceable.

Accordingly, there is a need in the art for a novel linear actuator that addresses and/or solves one or more of the above-listed problems. Such a device is disclosed herein.

SUMMARY OF THE INVENTION

The apparatus of the present invention has been developed in response to the present state of the art, and in particular, in response to the problems and needs in the art that have not yet been fully solved by currently available linear actuators. Thus, the present invention provides a linear actuator with an internal dampening mechanism that is capable of adequately dampening the motion of the piston at the end of the stroke.

According to one embodiment, the actuator comprises a housing having a first end and a second end. The housing is generally cylindrical in shape and defines an internal chamber capable of receiving and/or retaining a liquid or gaseous fluid. A constricted opening is also added to the linear actuator at the first end. A "constricted opening" is a hole or aperture in the actuator that is constructed such that the cross-sectional diameter of the linear actuator at the constricted opening is less than the cross-sectional diameter of the linear actuator at the second end.

Additionally, the linear actuator comprises a piston that is disposed within the housing. The piston comprises a shaft portion and a head portion and is configured to move or slide longitudinally along the internal chamber. Preferably, the shaft portion is constructed to be smaller in diameter than the constricted opening such that the shaft portion is slidable through the constricted opening. "Slidable through the constricted opening" means that the shaft portion is capable of exiting the linear actuator by moving or passing through the constricted opening. At the same time, the head portion is constructed such that it is not slidable through the constricted opening. The head portion has a diameter that is larger than the diameter of the constricted opening and as such, the head portion is bound within the internal chamber.

The linear actuator further comprises a fluid disposed within the internal chamber. In this embodiment, the fluid is an incompressible liquid such as oil and is positioned such that when the piston slides in the direction of the constricted opening, the fluid is forced through the constricted opening.

The linear actuator may further comprise a displacement mechanism positioned proximate the head portion. Preferably, the displacement mechanism comprises a supply of gas generant in communication with an initiator. A "gas generant" is a pyrotechnic or other material known in the art that produces or creates a of volume of hot gas when it is ignited. Various types of gas generants are known in the art and may be used in the present invention including liquid materials, gaseous materials, or solid materials. Mixtures of solid, liquid, and/or gaseous materials may also be used. The initiator is a device or mechanism that is capable of igniting the gas generant.

The displacement mechanism is capable of causing the actuator to undergo the deployment process. The "deployment process" is the process by which the displacement mechanism causes the piston to slide in the direction of the constricted opening. During the deployment process, the initiator ignites the gas generant to produce a volume of hot gas. This volume of hot gas is trapped behind the head portion through the use of one or more piston seals. As a result, the formation of the hot gas dramatically increases the pressure behind the head portion. In turn, this increase in pressure forces the piston to move or slide along the length of the internal chamber and causes the shaft portion, or at least a portion of the shaft portion, to slide through the constricted opening.

Such movement of the piston also forces the fluid through the constricted opening and dampens the movement of the piston. Because the diameter of the constricted opening is smaller than the diameter of other areas of the internal chamber, energy is required to push the fluid through the constricted opening. Thus, as the piston slides towards the constricted opening, some of the kinetic energy imparted to the piston becomes dissipated as the work necessary to force the fluid through the constricted opening. As a result, the kinetic energy of the piston is reduced and the movement of the piston is dampened at the end of the stroke.

According to another alternative embodiment, the linear actuator with the internal dampening mechanism may comprise a housing having a first end and a second end. Preferably, the housing is generally cylindrical and defines an internal chamber. As with the previous embodiment, this embodiment of the actuator also comprises a constricted opening disposed at the first end. A first piston disposed within the housing is also added to the actuator. Preferably, the first piston is configured to slide or move longitudinally along the internal chamber.

The first piston is constructed such that it comprises two sections: a shaft portion and a head portion. This shaft portion is an elongated rod or tube having a diameter that is smaller than the size of the constricted opening. Accordingly, the shaft portion is slidable through the constricted opening. On the other hand, the diameter of the head portion is larger than the diameter of the constricted opening such that the head portion is not slidable through the constricted opening.

This embodiment of the linear actuator comprises one or more second pistons disposed within the first piston. These second pistons are constructed such that when the actuator undergoes the deployment process, the second pistons telescopically extend from the first piston.

A fluid is also added to this embodiment of the actuator. The fluid is disposed within the housing within a fluid cavity that surrounds that shaft portion. One or more orifices are also positioned on or proximate the fluid cavity. These orifices are ports through which the fluid may flow. Preferably, the orifices are constructed such that if the first piston slides towards the constricted opening, the fluid passes through the orifices and causes the second pistons to telescopically extend from the first piston.

As with the previous embodiment, this embodiment of the actuator may further comprise a displacement mechanism positioned proximate the head portion. The displacement mechanism is capable of causing the actuator to undergo the deployment process and preferably comprises a gas generant in communication with an initiator.

During the deployment process, the initiator ignites the gas generant and produces a volume of hot gas. This hot gas is trapped behind the head portion through the use of one or more piston seals. As a result, the formation of the hot gas dramatically increases the pressure behind the head portion. In turn, this increase in pressure moves or slides the first piston downwards along the length of the internal chamber such that the shaft portion, or at least a portion of the shaft portion, slides through the constricted opening.

Such sliding of the first piston also causes the second pistons to telescopically extend from the first piston. As the first piston slides towards the constricted opening, the head portion contacts and presses against the fluid housed in the fluid cavity. This contact with the head portion forces the fluid through the orifices into a contact area located behind the second pistons. Because this contact area is sealed by one or more second piston seals, such an influx of the fluid into the contact area pushes against the second and causes the second piston to telescopically extend from the first piston.

Additionally, the actuator may further be constructed such that the movement of the fluid through the orifices dampens the movement of the first piston. Preferably, this is accomplished by configuring the size and/or number of the orifices such that energy is required to push the fluid through the orifices. Thus, as the first piston slides towards the constricted opening, some of the kinetic energy associated with the movement of the first piston is dissipated as the work required to force the fluid through the orifices. As a result, the total kinetic energy of the first piston is reduced and the movement of the first piston is dampened.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 8, is not intended to limit the scope of the invention, as claimed, but is merely representative of presently preferred embodiments of the invention.

Figure 1:
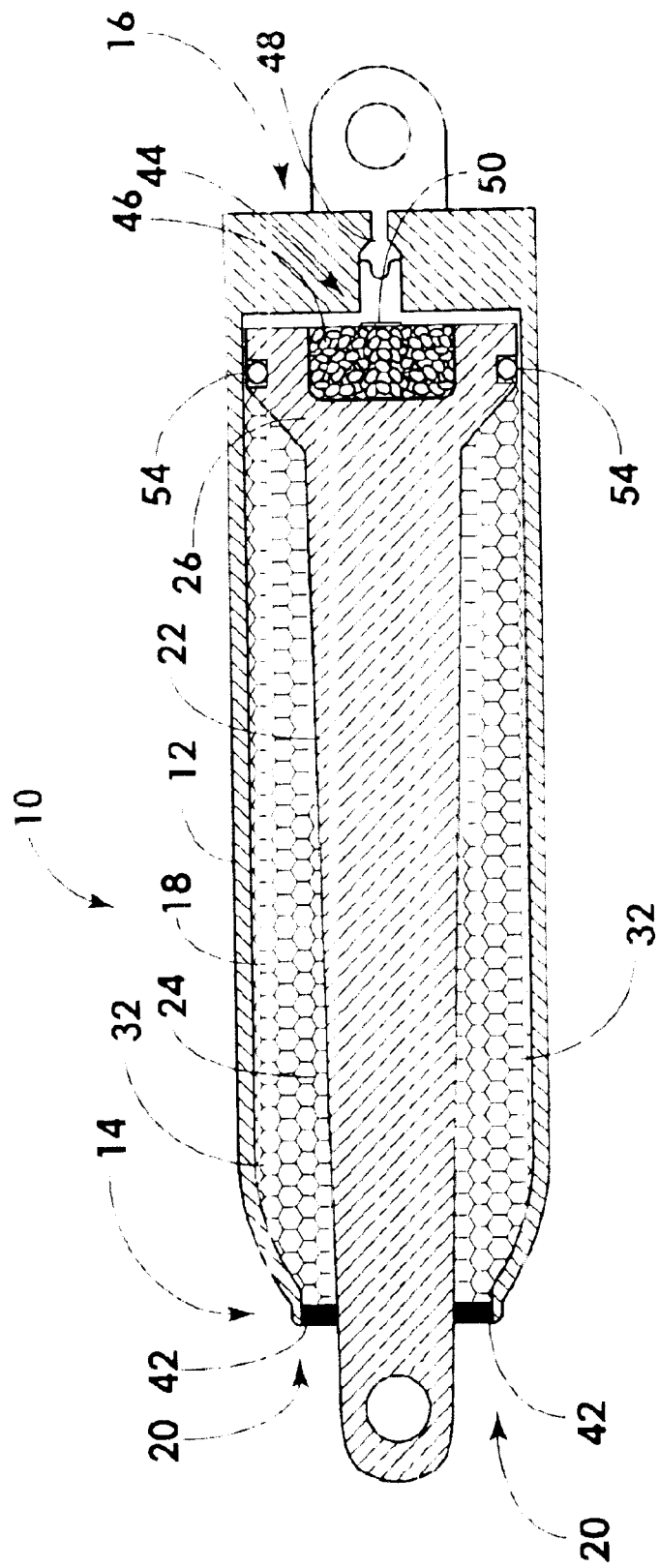
FIG. 1 is a longitudinal cross-sectional view of an embodiment of a linear actuator having an internal dampening mechanism according to the present invention.

Referring to FIG. 1, a cross-sectional view of the undeployed configuration of a linear actuator 10 having an internal dampening mechanism according to the present invention is illustrated. The actuator 10 comprises a housing 12 having a first end 14 and a second end 16. The housing 12 is generally cylindrical in shape and is made of metal, plastic, or other materials known in the art. Preferably, the housing 12 defines an internal chamber 18 capable of receiving and/or retaining a liquid or gaseous fluid.

The linear actuator 10 also comprises a constricted opening 20 disposed at the first end 14. A "constricted opening" is a hole or aperture in the actuator 10 that is constructed such that the cross-sectional diameter of the linear actuator 10 at the constricted opening 20 is less than the cross-sectional diameter of the linear actuator 10 at the second end 16.

A piston 22 is added to the linear actuator 10. The piston 22 is disposed within the housing 12 and is made of plastic, metal, or other materials known in the art. Preferably, the piston 22 is configured to move or slide longitudinally along the internal chamber 18.

The piston 22 is further constructed such that it comprises two sections or portions: a shaft portion 24 and a head portion 26. The shaft portion 24 is an elongated rod or tube that extends longitudinally along the length of the internal chamber 18. The diameter of the shaft portion 24 is smaller than the constricted opening 20 such that the shaft portion 24 is slidable through the constricted opening 20. "Slidable through the constricted opening" means that the shaft portion 24 is capable of exiting the linear actuator 10 by moving or passing through the constricted opening 20.

The head portion 26 is constructed such that it is not slidable through the constricted opening 20. More specifically, the head portion 26 is a section of the piston 22 having a diameter that is larger than the constricted opening 20. This difference in size between the head portion 26 and the constricted opening 20 binds the head portion 26 within the internal chamber 18.

In the embodiment depicted in FIG. 1, the length of the shaft portion 24 has been set such that a portion of the shaft portion 24 protrudes out of the internal chamber 18 through the constricted opening 20. However, the length of the shaft portion 26 may also be selected such that the shaft portion 24 is fully housed within the internal chamber 18.

The linear actuator 10 may further be constructed such that it comprises a fluid 32. The fluid 32 is disposed within the internal chamber 18. Preferably, the fluid 32 is an incompressible liquid such as oil. Of course, other types of fluids, such as hydraulic and/or compressible fluids, may also be used.

The fluid 32 is configured and positioned within the internal chamber 18 such that when the piston 22 slides in the direction of the constricted opening 20, the fluid 32 is forced through the constricted opening 20. However, because the fluid 32 is also capable of passing through the constricted opening 20 prior to the movement of the piston 22, one or more blowout seals 42 are usually added to cover and/or seal the constricted opening 20.

Additionally, the linear actuator 10 may comprise a displacement mechanism 44 positioned proximate the head portion 26. Preferably, the displacement mechanism 44 is constructed such that it is capable causing the piston 22 to slide and/or undergo linear displacement in the direction of the constricted opening 20.

In the embodiment shown in FIG. 1, the displacement mechanism 44 comprises a supply of gas generant 46 in communication with an initiator 48. A "gas generant" is a pyrotechnic or other material known in the art that produces or creates of volume of hot gas when it is ignited. Various types of gas generants 34 are known in the art and may be used in the present invention including liquid materials, gaseous materials, or solid materials. Mixtures of solid, liquid, and/or gaseous materials may also be used. However, as some materials used as the gas generant 46 may prematurely ignite, barrier foils 50 may also be added to separate the gas generant 46 from the air and/or other components of the actuator 10.

The initiator 48 used in the present invention may be any type of initiator known in the art. Preferably, the initiator 48 comprises a device or mechanism that ignites the gas generant 46 by adding a spark, heat, and/or current to the gas generant 46. However, other types of devices and/or mechanisms capable of igniting the gas generant 46 may also be used.

In addition to the gas generant 46 and the initiator 48, other types of devices and/or mechanism may be used as the displacement mechanism 44. For example, any electrical, mechanical, compressed gas, or magnetic mechanism or device that is capable of causing the shaft portion 24 to slide in the direction of the constricted opening 20 may be used as the displacement mechanism 44.

The displacement mechanism 44 may also be configured such that it communicates with a control unit (not shown) and/or other apparatus that is capable of signaling the linear actuator 10 to undergo the deployment process. The "deployment process" is the process by which the displacement mechanism 44 causes the piston 22 to slide in the direction of the constricted opening 20.

Figure 2:
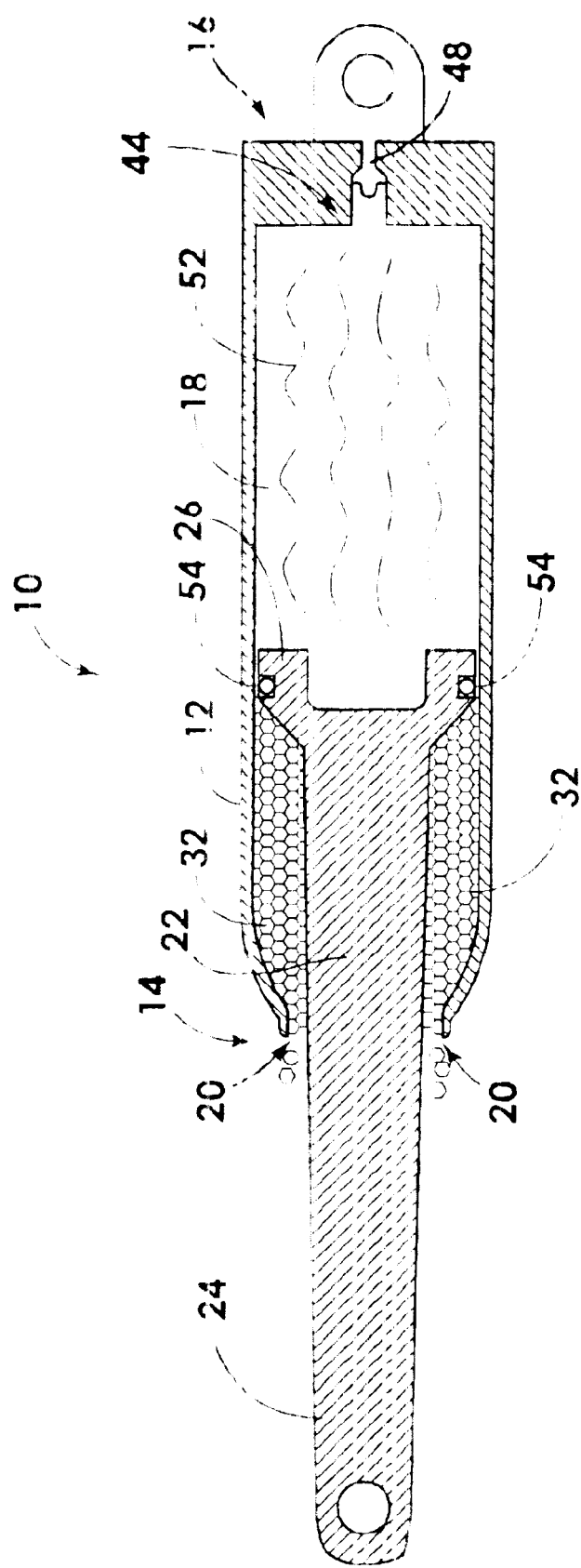
FIG. 2 is a longitudinal cross-sectional view of the embodiment shown in FIG. 1 undergoing the deployment process.

Referring now to FIG. 2, the deployment process of the linear actuator 10 is shown in greater detail. When the displacement mechanism 44 receives the appropriate signal from the control unit (not shown), the initiator 48 begins the deployment process by disintegrating and/or removing the barrier foils 50. Once the barrier foils 50 are removed, the initiator 48 then ignites the gas generant 46 to produce a volume of hot gas 52.

The volume of hot gas 52 produced by the ignition of the gas generant 46 is trapped behind the head portion 26 through the use of one or more piston seals 54. As a result, the formation of the hot gas 52 dramatically increases the pressure behind the head portion 26. In turn, this increase in pressure moves the piston 22 downwards along the length of the internal chamber 18 such that the shaft portion 24, or at least a portion of the shaft portion 24, slides through the constricted opening 20.

The sliding of the piston 22 also operates to remove the blowout seals 42. As the piston 22 slides towards the constricted opening 20, the piston 22 contacts and presses against the fluid 32 that is housed within the internal chamber 18. This contact forces causes the fluid 32 to push against and subsequently remove the blowout seals 42 from covering and/or blocking the constricted opening 20.

As seen in FIG. 2, once the blowout seals 42 have been removed, the movement of the piston 22 forces the fluid 32 to exit the internal chamber 18 through the constricted opening 20. In turn, such venting of the fluid 32 out of the internal chamber 18 also operates to dampen the movement of the piston 22 at the end of the stroke. More specifically, because the diameter of the constricted opening 20 is smaller than the diameter of other areas of the internal chamber 18, energy is required to push the fluid 32 through the constricted opening 20. Thus, as the piston 22 slides towards the constricted opening 20, some of the kinetic energy imparted to the piston 22 becomes dissipated as the work necessary to force the fluid 32 through the constricted opening 20. As a result, the kinetic energy of the piston 22 is reduced and the movement of the piston 22 is dampened.

By configuring the linear actuator 10 such that the movement of the piston 22 forces the fluid 32 through the constricted opening 20, significant advantages may be achieved over the prior art. First, the present invention provides an easy and efficient mechanism for dampening the movement of the piston 22. Moreover, by forcing the fluid 32 through the constricted opening 20, the present invention incorporates the dampening mechanism into the linear actuator 10 itself. As a result, the need for a bulky or expensive external dampening system is effectively eliminated.

Figure 3:
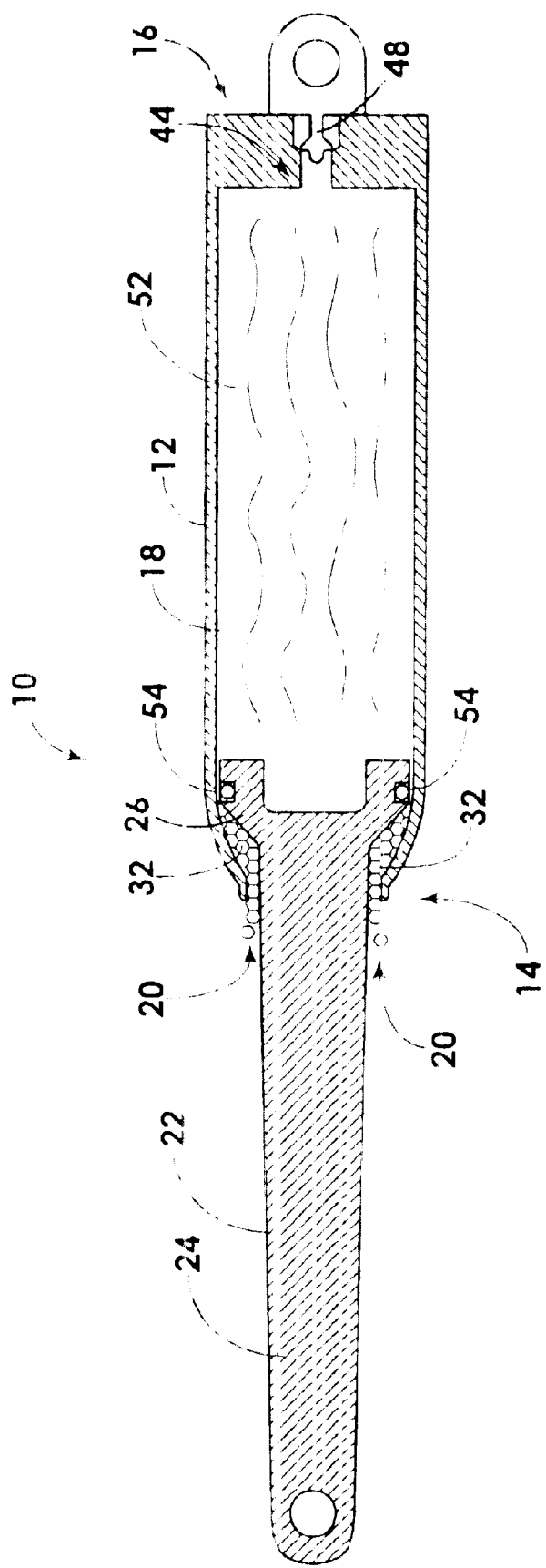
FIG. 3 is a longitudinal cross-sectional view of the embodiment shown in FIG. 1 after termination of the deployment process.

Referring now to FIG. 3, the linear actuator 10 of FIG. 1 is shown after the deployment process has completed. The volume of hot gas 52 has exerted sufficient pressure on the piston 22 such that the shaft portion 24 had passed through the constricted opening 20. At the same time, the head portion 26 has been moved such that it is adjacent to the first end 14. However, because of the differences in size between the head portion 26 and the constricted opening 20, the head portion 26 is bound within the internal chamber 18.

As illustrated in FIG. 3, the linear actuator 10 may be constructed such that the amount of fluid 32 forced through the constricted opening 20 varies with the movement of the piston 22. Preferably, this is accomplished by tapering the shaft portion 24. More particularly, as the shaft portion 24 moves through the constricted opening 20, the shaft portion 24 blocks and/or covers an area of the constricted opening 20. The exact size of this blocked area directly affects the amount of the fluid 32 that may be forced through the constricted opening 20. However, by tapering the shaft portion 24, the movement of the shaft portion 24 changes the size of the blocked area and thus, also changes the amount of the fluid 32 that may be compressed through the constricted opening 20.

Moreover in FIG. 3, the shaft portion 24 has been tapered such that as the head portion 26 moves towards the constricted opening, the diameter of the shaft portion 24 increases. Thus, as the head portion 26 approaches the constricted opening 20, the amount of fluid 32 that is forced out of the internal chamber 18 through the constricted opening 20 decreases and as a result, the dampening effect on the movement of the piston 22 also increases (i.e. the piston 22 slows down).

Figure 4:
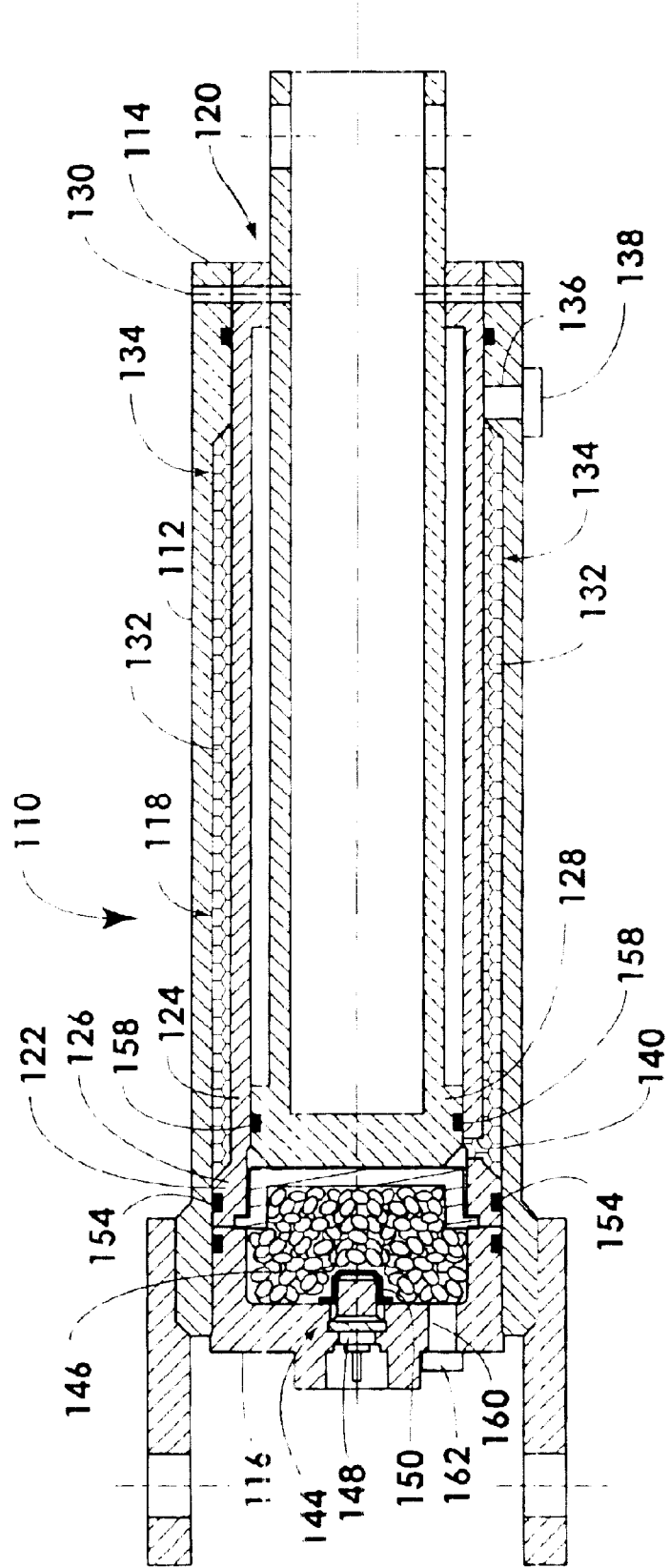
FIG. 4 is a longitudinal cross-sectional view of a further embodiment of a linear actuator having an internal dampening mechanism according to the present invention.

Referring to FIG. 4, a further embodiment of the present invention is illustrated. FIG. 4 is a cross-sectional view of the undeployed configuration a linear actuator 110 having an internal dampening mechanism according to the present invention.

The linear actuator 110 generally comprises a housing 112 having a first end 114 and a second end 116. The housing 112 is generally cylindrical in shape and may be made of metal, plastic, or other materials known in the art. Preferably, the housing 112 defines an internal chamber 118 capable of receiving and/or retaining a liquid or gaseous fluid.

The linear actuator 110 further comprises a constricted opening 120 positioned at the first end 114. As with the previous embodiment, the constricted opening 120 is an opening or aperture on the housing 112. As outlined above, the constricted opening 120 is constructed such that the cross-sectional diameter of the actuator 110 at the constricted opening 120 is less than the cross-sectional diameter of the actuator 110 at the second end 116.

The actuator 110 is further constructed such that a first piston 122 is disposed within the housing 112. The first piston 122 is made of metal, plastic, or other materials known in the art and is configured to move or slide longitudinally along the internal chamber 118.

The first piston 122 is further constructed such that it comprises two sections: a shaft portion 124 and a head portion 126. The shaft portion 124 is an elongated rod or tube having a diameter that is smaller than the size of the constricted opening 120. Accordingly, the shaft portion 124 is ridable through the constricted opening 120. On the other hand, the diameter of the head portion 126 is larger than the diameter of the constricted opening 120. As a result, the difference in size between the head portion 126 and the constricted opening 120 binds the head portion 126 within the internal chamber 118 such that the head portion 126 is not slidable through the constricted opening 120.

In the embodiment depicted in FIG. 4, the first piston 122 has been constructed such the shaft portion 124 ends at the first end 114. However, as outlined above, other embodiments may be made in which the shape, length, size, and/or configuration of the first piston 122 differs from that which is shown in FIG. 4. For example, some embodiments may be made in which the shaft portion 124 protrudes out of the internal chamber 118 through the constricted opening 120. Still other embodiments may be made in which the shaft portion 124 is tapered.

The linear actuator 110 further comprises one or more second pistons 128 disposed within the first piston 122. Preferably, the first piston 122 is hollow such that the second pistons 128 may be stacked or otherwise fit within the first piston 122. A shear pin 130 may also be added to hold the first piston 122 and the second pistons 128 in the proper configuration.

Unlike the actuator shown in FIGS. 1–3, the linear actuator 110 is a telescoping actuator. Thus, the second pistons 128 are capable of telescopically extending from the first piston 122. More specifically, the second pistons 128 are constructed such that when the linear actuator 110 undergoes the deployment process, the second pistons 128 telescopically extend from the first piston 122.

In the embodiment of the actuator 110 shown in FIG. 4, the actuator comprises one second piston 128 that protrudes out of the internal chamber 118 through the constricted opening 120. However, other embodiments may be made in which the number, shape, and or configuration of the second pistons 128 differs from that which is shown in FIG. 4. For example, the actuator 110 may be constructed to comprise more than one second piston 128. Still other embodiments may be made in which the second pistons 128 do not protrude out of the internal chamber 118. Yet further embodiments may be constructed to have the second pistons 128 fully housed within the first piston 122.

The linear actuator 110 also comprises a fluid 132 disposed within the housing 112. The fluid 132 may be a compressible fluid, an incompressible fluid, or another hydraulic fluid known in the art. The fluid 132 is housed within a fluid cavity 134 that has been specifically designed to receive and/or house fluid 132. Preferably, the fluid cavity 134 is concentric with the first piston 122 such that the fluid cavity 134 surrounds the shaft portion 126.

A fluid fill port 136 may also be added to the actuator 110 adjacent to the fluid cavity 134. The fill port 136 is an opening or aperture in the housing 112 through which the fluid 132 may be added to the cavity 134. However, once the cavity 134 has been filled with the fluid 132, a plug 138 is added to seal the fill port 136 and prevent the fluid 132 from leaking out of the fluid cavity 134.

The linear actuator 110 further comprises one or more orifices 140 positioned on or proximate the fluid cavity 129. The orifices 140 are ports through which the fluid 132 may flow. Preferably, orifices 140 are constructed such that if the first piston 122 slides towards the constricted opening 120, the fluid 132 passes through the orifices 140 and causes the second pistons 128 to telescopically extend from the first piston 122.

Referring still to FIG. 4, the linear actuator 110 may additionally comprise a displacement mechanism 144. The displacement mechanism 144 is capable of causing the actuator 110 to undergo the deployment process. Preferably, the displacement mechanism 144 is positioned proximate the head portion 126.

As with the embodiment outlined in FIGS. 1–3, the displacement mechanism 144 comprises a supply of solid gas generant 146 in communication with an initiator 148. One or more barrier foils 150 may also be added to seal off the gas generant 146 in order to avoid premature ignition. Of course, other devices or systems that are capable of causing the shaft portion 124 to slide in the direction of the constricted opening 120 may be used as the displacement mechanism 144. For example, some embodiments may construct the displacement mechanism 144 such that the gas generant 146 comprises liquid materials, gaseous materials, and/or a mixture of solid, liquid, and/or gaseous materials. Still other embodiments may vary or change the mechanism by which the initiator 148 operates to ignite the gas generant 146. Yet further embodiments may have the displacement mechanism 144 comprise an electrical, mechanical, compressed gas, and/or magnetic device capable of causing the shaft portion 124 to slide in the direction of the constricted opening 120.

Figure 5:
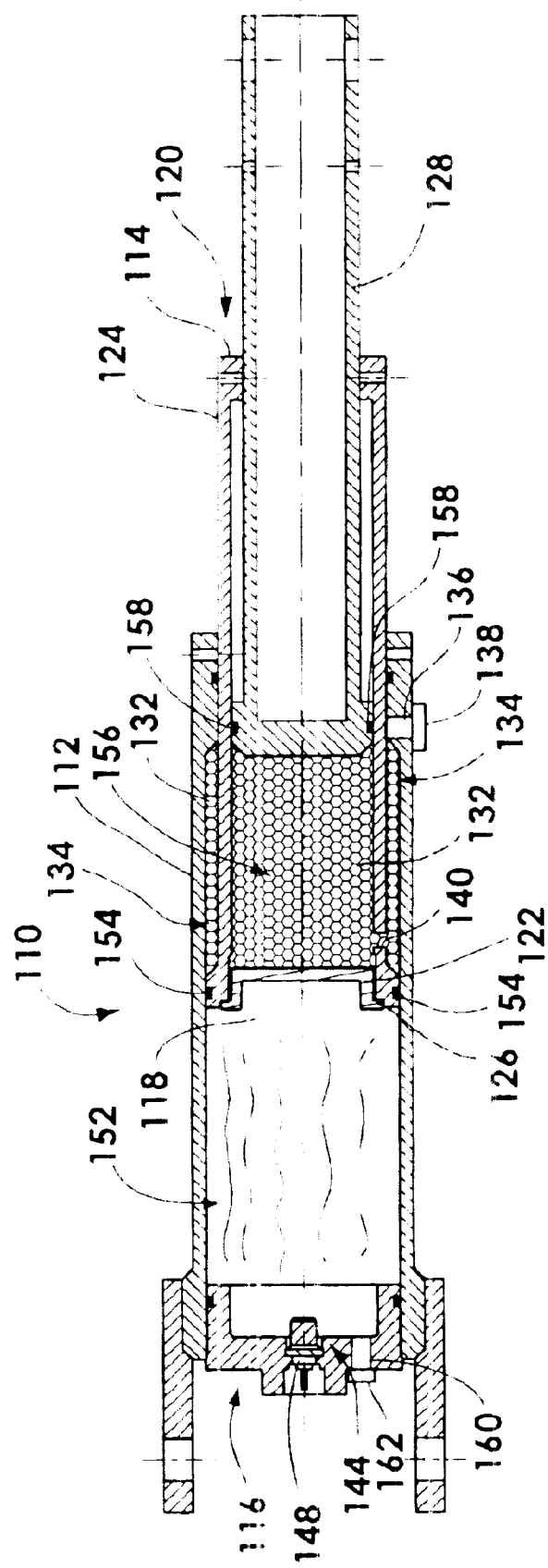
FIG. 5 is a longitudinal cross-sectional view of the embodiment shown in FIG. 4 undergoing the deployment process.

Referring now to FIG. 5, the deployment process of the actuator 110 is depicted in greater detail. As with the previous embodiment, the displacement mechanism 144 is preferably attached to a control unit (not shown) that is capable of signaling the actuator 110 to undergo the deployment process. When the appropriate signal is received, the initiator 148 begins the deployment process by disintegrating and/or removing the barrier foils 150. Once the barrier foils 150 are removed, the initiator 148 then ignites the gas generant 146 to produce a volume of hot gas 152.

The volume of hot gas 152 produced by the ignition of the gas generant 146 is trapped behind the head portion 126 through the use of one or more piston seals 154. As a result, the formation of the hot gas 152 dramatically increases the pressure behind the head portion 126. In turn, this increase in pressure moves or slides the first piston 122 downwards along the length of the internal chamber 118 such that the shaft portion 124, or at least a portion of the shaft portion 124, slides through the constricted opening 120.

The sliding of the first piston 122 towards the constricted opening 120 also causes the second pistons 128 to telescopically extend from the first piston 122. As the first piston 122 slides towards the constricted opening, the head portion 126 contacts and presses against the fluid 132 housed in the fluid cavity 134. This contact with the head portion 126 forces the fluid 132 through the orifices 140 into the contact area 156 located behind the second pistons 128. Because this contact area 156 is sealed by one or more second piston seals 158, such an influx of the fluid 132 into the contact area 156 pushes against the second pistons 128 and causes the second pistons 128 to telescopically extend from the first piston 122.

Additionally, the actuator 110 may further be constructed such that the movement of the fluid 132 through the orifices 140 dampens the movement of the first piston 122. Preferably, this is accomplished by configuring the size and/or number of the orifices 140 such that energy is required to push the fluid 132 through the orifices 140. Thus, as the first piston 122 slides towards the constricted opening 120, some of the kinetic energy 122 associated with the movement of the first piston 122 is dissipated as the work required to force the fluid 132 through the orifices 140. As a result, the total kinetic energy of the first piston 122 is reduced and the movement of the first piston 122 is dampened at the end of the stroke.

Figure 6:
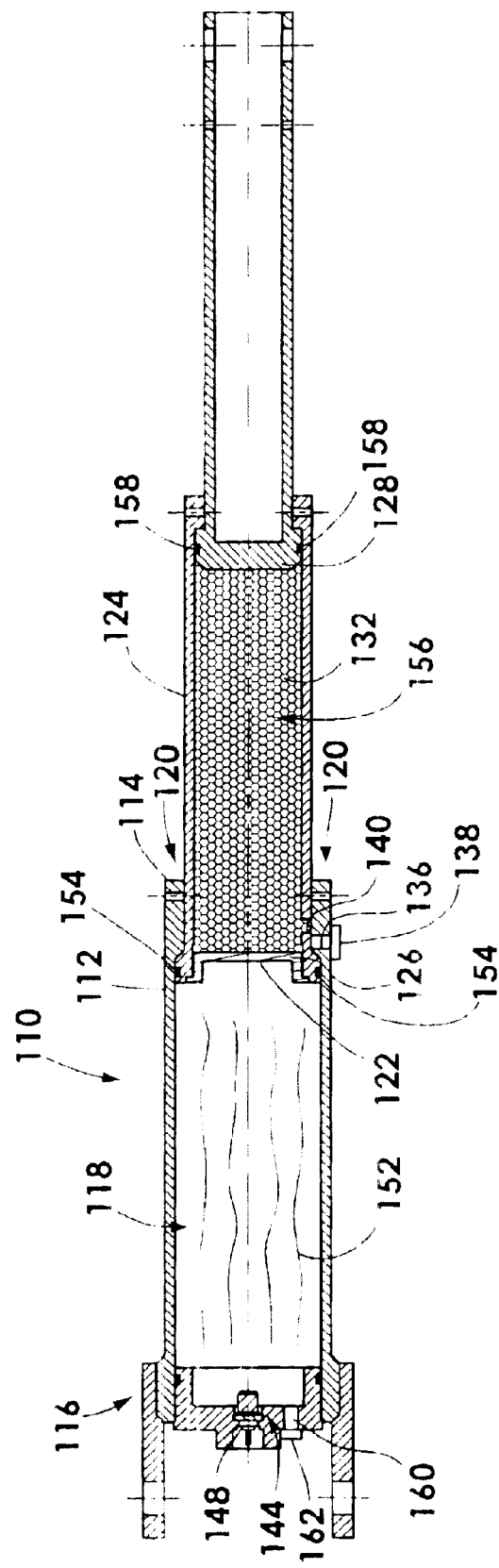
FIG. 6 is a longitudinal cross-sectional view of the embodiment shown in FIG. 4 after termination of the deployment process.

Referring now to FIG. 6, the actuator 110 is shown after it has completed the deployment process. Specifically, the volume of hot gas 152 has exerted sufficient force and pressure upon the first piston 122 such that the shaft portion 124 has slid through the constricted opening 120. At the same time, the fluid 132 has passed through the orifices 140 and caused the second pistons 128 to telescopically extend from the first piston 122.

In FIG. 6, the amount of the fluid 128 that has passed through orifices 140 is sufficient to fill the contact area 156 and fully extend the second pistons 128 from the first piston 122. Of course, other embodiments may also be made in which the amount of fluid that passes through the orifices 140 is not sufficient to fully extend the second pistons 128 from the first piston 122.

Referring still to FIG. 6, the actuator 110 may additionally comprise a vent hole 160. The vent hole 160 is an aperture or opening in the housing 112 that is positioned on or proximate to the second end 116. Preferably, the vent hole 160 is sealed through a vent screw 162.

The vent hole 160 is constructed to allow the actuator 110 to be reset after it has been deployed. Preferably, this is accomplished by configuring the vent hole 160 such that the vent screw 162 may be loosened and/or removed from the vent hole 160 after the deployment process has completed. Such loosening and/or removal of the vent screw 162 depressurizes the actuator 110 such that the actuator 110 may be collapsed into the undeployed configuration shown in FIG. 4. A new supply of gas generant 146 is then added to the displacement mechanism 144 and the vent hole 160 is then resealed by the vent screw 162. Once resealed, the actuator 110 has been effectively reset such that it may be reused and redeployed in the future.

Figure 7:
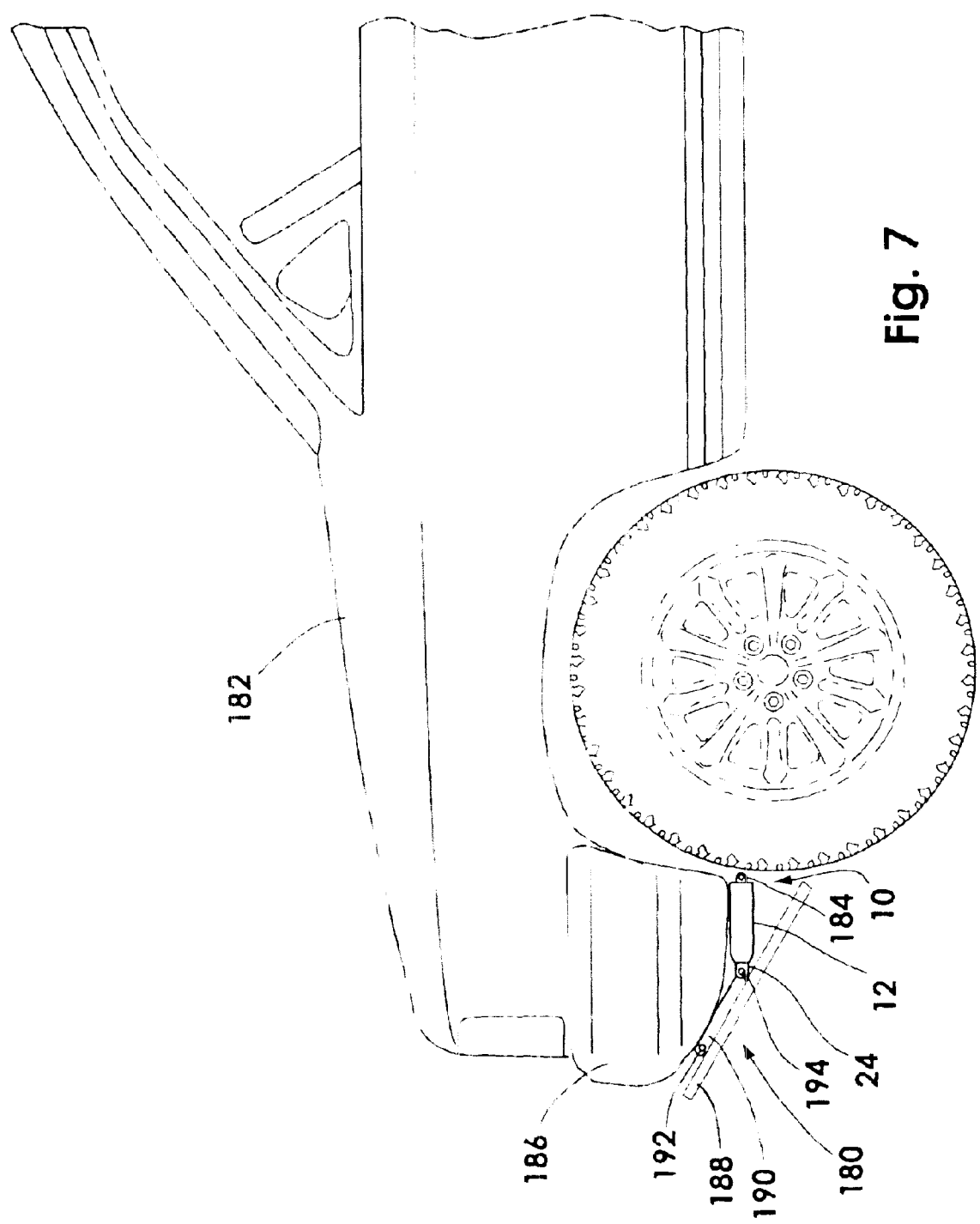
FIG. 7 is a perspective view of an embodiment of the present invention installed on the front portion of a vehicle as part of a modified bumper system.

Referring now to FIG. 7, the way in which the linear actuator of the present invention may be incorporated into a modified bumper system 180 is illustrated. More specifically, FIG. 7 depicts the embodiment shown as the actuator 10 added to the vehicle 182 as part of the modified bumper system 180. Of course, in a like manner, the embodiment shown as the actuator 110 in FIGS. 4 through 6 may also be added to the vehicle 182 and used in the modified bumper system 180.

In FIG. 7, the actuator 10 has been added to the vehicle 182 via one or more pin joints 184. The pin joints 184 are added to the exterior of the actuator 10 and are designed such that fasteners such as bolts or the like may engage the pin joints 184 and affix the actuator 10 to the vehicle 182. Preferably, the pin joints 184 attach the actuator 10 to the vehicle 182 on or proximate to a bumper 186. However, other methods, such as welding and the like, may also be used to attach the actuator 10 to the vehicle 182.

The modified bumper system 180 is positioned on the vehicle 182 on or proximate to the bumper 186. In general, the modified bumper system 180 comprises the actuator 10 and a reactive member 188 constructed to provide impact protection to the vehicle 182 during a crash. In FIG. 7, the reactive member 188 comprises a deformable plate capable of dissipating a portion of the kinetic energy associated with the crash. However, other structures may also be used to comprise the reactive member 188. For example, in some embodiments, the reactive member 188 may comprise all or a portion of the bumper 186. Yet further embodiments may have the reactive member 188 may comprise a structure designed to support an inflated bumper airbag.

The modified bumper system 180 may further comprise an extending arm 190. The extending arm 190 is preferably an elongated rod constructed of metal, plastic, or the like. One end of the extending arm 190 is attached to the bumper 186 via one or more pin joints 192 designed such that fasteners such as bolts or the like may engage the pin joints 192 and affix the extending arm 190 to the bumper 186. The other end of the extending arm 190 attaches to the linear actuator 10 via a pin joint 194 that is likewise designed such that fasteners such as bolts or the like may engage the pin joints 194 and affix the extending arm 190 to the actuator 10 through the shaft portion 24 that protrudes out of the housing 12.

Other embodiments may also be made in which the shape, composition, and/or configuration of the extending arm 190 differs from that which is shown in FIG. 7. For example, embodiments may be made in which the extending arm 190 is made from materials other than metal or plastic. Other embodiments may vary the shape of the extending arm 190. Still other embodiments may have the extending arm 190 attached to other portions of the vehicle 182. Yet further embodiments may attach the extending arm 190 attached to the bumper 186, the vehicle 182, and/or the actuator 10 via other methods such as through welding and the like.

The modified bumper system 180 is constructed to deploy the reactive member 188 in the event of an accident or crash. More specifically, the bumper system 180 is constructed such that during a crash, the actuator 10 deploys the reactive member 188 downwards into a position capable of providing support and/or impact protection to the vehicle 182.

Figure 8:
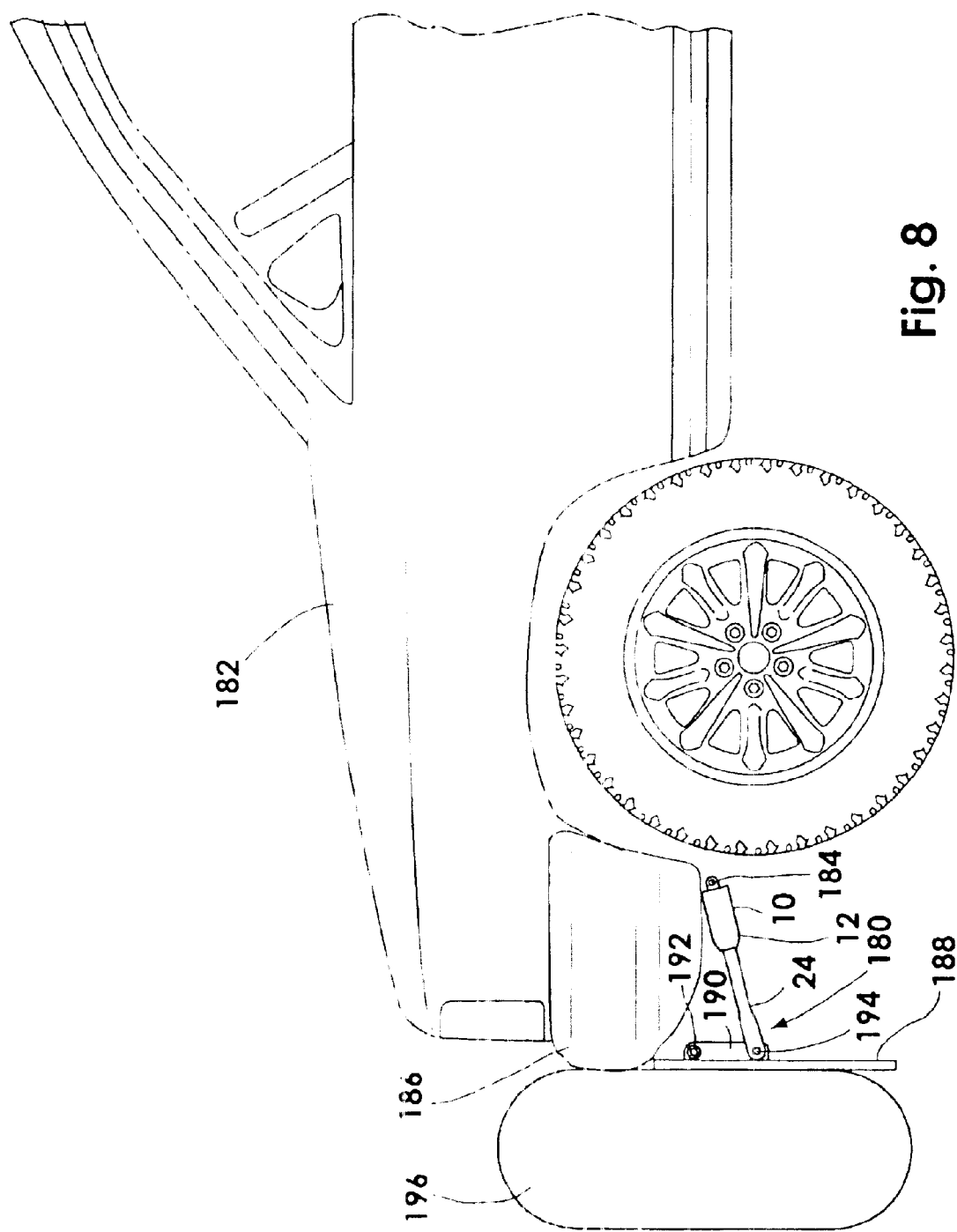
FIG. 8 is a perspective view of the modified bumper system of FIG. 7 after the bumper system has undergone the deployment process.

Referring now to FIG. 8, the way in which the embodiment of the actuator 10 operates to deploy the reactive member 188 in the event of an accident or crash is illustrated. Of course, in a similar manner, the embodiment shown as the actuator 110 may likewise be used to deploy the reactive member 188.

In the event of an accident or crash, the control unit (not shown) signals the actuator 10 and causes the actuator 10 to undergo the deployment process. As outlined above, this deployment of the actuator 10 moves the first piston 22 (shown in FIGS. 1 through 3) such that all or a portion of the shaft portion 24 extends outwards from the housing 12.

The bumper system 180 is constructed such that this movement of the shaft portion 24 deploys the reactive member 188. More specifically, as the shaft portion 24 is attached to the extending arm 190, the movement of the shaft portion 24 during the deployment process also moves and deploys the extending arm 190 into a vertical position. In turn, this movement of the extending arm 190 moves the reactive member 188 downwards into a position capable of providing impact protection to the vehicle 182 during a crash.

As seen in FIG. 8, the modified bumper system 180 may additionally be used in conjunction with an inflatable bumper airbag 196. This inflatable bumper airbag 196 is preferably mounted and stored on the vehicle 182 proximate the bumper 186.

Preferably, the inflatable bumper airbag 196 is configured such that in the event of an accident, the bumper airbag 196 inflates and covers all or a portion of the exterior of the vehicle 182. This may be accomplished by attaching the bumper airbag 196 to an inflator (not shown). The inflator is a gas generator that typically uses a compressed or liquefied gas or mixture of gases, a solid or liquid fuel, or some combination of the two, to rapidly generate a large volume of inflation gas (not shown) during a crash. This inflation gas is then channeled to the bumper airbag 196 such that the bumper airbag 196 inflates and covers an exterior portion of the vehicle 182.

In the embodiment of the bumper system 180 shown in FIG. 8, the reactive member 188 has been further configured to support the inflated bumper airbag 196 during a crash. Preferably, this is accomplished by configuring the modified bumper system 180 such that all or a portion of the inflated bumper airbag 196 is positioned in front of the deployed reactive member 188. As a result, when a crash occurs, the reactive member 188 supports and holds the inflated bumper airbag 196 in the desired position, to ensure that the bumper airbag 196 properly absorbs and dissipates a portion of the energy of the crash.

Referring now to FIGS. 1–8 generally, the present invention also provides for a method for using a linear actuator with an internal dampening system to deploy a reactive member in the event of a crash. First, a reactive member 188 is attached to the vehicle 182. As noted above, this reactive member 188 may be a deformable plate, all or a portion of a bumper 186, and/or a structure designed to support an inflated bumper airbag 196.

Next, the actuator 10, 110 is mounted to the vehicle 182 proximate the reactive member 188. Once the actuator 10, 110 has been mounted, the last step involves configuring the actuator 10, 110 is configured such that the sliding of the shaft portion 26, 126 through the constricted opening 20, 120 deploys the reactive member 188. Preferably, this last step involves configuring the actuator 10, 110 such that the sliding of the shaft portion 26, 126 deploys the reactive member 188 into a vertical position.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A linear actuator comprising:
    a housing having a first end and a second end, the housing defining an internal chamber;
    a constricted opening disposed at the first end;
    a piston being disposed within the housing, the piston having a shaft portion and a head portion, the shaft portion being constructed such that it is slidable through the constricted opening and the head portion being constructed such that it is not slidable through the constricted opening; and
    a fluid disposed within said internal chamber such that when the piston slides in the direction of the constricted opening, the fluid is forced through the constricted opening such that the movement of the piston is dampened.

2. An actuator as in claim 1 further comprising a displacement mechanism that is capable of causing the shaft portion to slide through the constricted opening.

3. An actuator as in claim 2 wherein the displacement mechanism comprises a gas generant in communication with an initiator.

4. An actuator as in claim 3 further comprising a one or more barrier foils.

5. An actuator as in claim 3 wherein the initiator is capable of igniting the gas generant.

6. An actuator as in claim 1 further comprising one or more blowout seals that cover the constricted opening.

7. An actuator as in claim 6 wherein the sliding of the piston towards the constricted opening operates to remove the one or more blowout seals.

8. An actuator as in claim 1 further comprising one or more piston seals.

9. An actuator as in claim 1 further comprising one or more pin joints positioned on the exterior of the actuator.

10. An actuator as in claim 9 wherein the one or more pin joints are used to mount the actuator to a vehicle on or proximate to the vehicle's bumper.

11. An actuator as in claim 1 wherein the actuator is used to deploy a reactive member.

12. An actuator as in claim 11 wherein the reactive member comprises a deformable plate.

13. An actuator as in claim 11 wherein the reactive member is designed to support an inflated bumper airbag.

14. An actuator as in claim 11 wherein the reactive member comprises all or a portion of the vehicle's bumper.

15. An actuator as in claim 1 wherein the shaft portion is attached to an extending arm.

16. An actuator as in claim 1 wherein the actuator has been constructed such that the amount of fluid forced through the constricted opening varies with the movement of the piston.

17. An actuator as in claim 1 wherein the shaft portion is tapered.

18. A linear actuator designed to deploy a reactive member, the actuator comprising:

a housing having a first end and a second end, the housing defining an internal chamber;

a constricted opening disposed at the first end;

a piston being disposed within the housing, the piston having a shaft portion and a head portion, the shaft portion being constructed such that it is slidable through the constricted opening and the head portion being constructed such that it is not slidable through the constricted opening;

a displacement mechanism capable of causing the shaft portion to slide through the constricted opening; and a fluid disposed within said internal chamber such that when the piston slides in the direction of the constricted opening, the fluid is forced through the constricted opening such that the movement of the piston is dampened.

19. An actuator as in claim 18 wherein the displacement mechanism comprises a gas generant in communication with an initiator.

20. An actuator as in claim 18 further comprising one or more blowout seals covering the constricted opening, wherein the actuator is constructed such that the sliding of the piston towards the constricted opening is configured to remove one or more blowout seals.

21. An actuator as in claim 18 wherein, the actuator has been constructed such that the amount of fluid that may be forced through the constricted opening varies with the movement of the piston.

22. An actuator as in claim 18 wherein the reactive member comprises a deformable plate.

23. An actuator as in claim 18 wherein the reactive member is designed to support an inflated bumper airbag.

24. An actuator as in claim 18 wherein the reactive member comprises all or a portion of the vehicle's bumper.

25. A method for using a linear actuator to deploy a reactive member comprising:

attaching the reactive member to the vehicle;

mounting a linear actuator onto the vehicle proximate the reactive member, the linear actuator comprising a housing having a first end and a second end, the housing defining an internal chamber, a constricted opening disposed at the first end, a piston being disposed within the housing, the piston having a shaft portion and a head portion, the shaft portion being constructed such that it is slidable through the constricted opening and the head portion being constructed such that it is not slidable through the constricted opening, and a fluid disposed within said internal chamber such that when the piston slides in the direction of the constricted opening, the fluid is forced through the constricted opening such that the movement of the piston is dampened; and configuring the linear actuator such that the sliding of the shaft portion through the constricted opening deploys the reactive member.

26. A method as in claim 25 wherein the configuring step comprises sliding of the shaft portion through the constricted opening deploys the reactive member downwards into a position capable of providing support or impact protection to the vehicle.

27. A method as in claim 25 wherein the reactive member comprises a deformable plate.

28. A method as in claim 25 wherein the reactive member comprises all or a portion of a vehicle bumper.

29. A method as in claim 25 wherein the reactive member is designed to support an inflated bumper airbag.

* * * * *